(12) United States Patent
Conner et al.

(10) Patent No.: US 9,809,313 B2
(45) Date of Patent: Nov. 7, 2017

(54) CABIN ALTITUDE ALERTING SYSTEMS AND METHODS

(75) Inventors: Kevin J Conner, Kent, WA (US);
Yasuo Ishihara, Kirkland, WA (US);
Steve C. Johnson, Issaquah, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1625 days.

(21) Appl. No.: 11/625,764

(22) Filed: Jan. 22, 2007

(65) Prior Publication Data

US 2008/0176501 A1  Jul. 24, 2008

(51) Int. Cl.
*B64D 13/02* (2006.01)

(52) U.S. Cl.
CPC .................... *B64D 13/02* (2013.01)

(58) Field of Classification Search
CPC ..................................................... B64D 13/02
USPC ........................................................... 454/72
See application file for complete search history.

(56) References Cited

U.S. PATENT DOCUMENTS

| | | | |
|---|---|---|---|
| 4,164,900 A * | 8/1979 | Aldrich | 454/72 |
| 4,253,335 A | 3/1981 | Shimomura | |
| 5,022,393 A | 6/1991 | McGrady et al. | |
| 5,357,949 A * | 10/1994 | Bertheau et al. | 128/204.29 |
| 5,522,026 A * | 5/1996 | Records et al. | 715/710 |
| 6,507,776 B1 * | 1/2003 | Fox, III | 701/11 |
| 6,737,988 B2 * | 5/2004 | Horner et al. | 340/970 |
| 2003/0081812 A1* | 5/2003 | Yamamoto et al. | 382/103 |
| 2004/0094666 A1* | 5/2004 | Rogitz | 244/118.5 |

FOREIGN PATENT DOCUMENTS

| | | |
|---|---|---|
| EP | 1476355 B1 | 11/2004 |
| GB | 00852160 A | 10/1960 |
| GB | 2416616 A | 2/2006 |
| WO | WO 03072432 A1 | 9/2003 |

* cited by examiner

*Primary Examiner* — Steven B McAllister
*Assistant Examiner* — Samantha Miller
(74) *Attorney, Agent, or Firm* — Lorenz & Kopf, LLP

(57) ABSTRACT

Systems and methods for intelligently alerting the flight crew of a cabin depressurization. An example system includes a cabin altimeter that generates a cabin pressure value, an alerting device, such as a speaker system and a processing device in data communication with the cabin altimeter and the alerting device. The processing device determines if there is a problem with the cabin pressure received from the cabin altimeter, determines rate of change of the cabin pressure, and sets at least one of an alert volume or an alert frequency based on the cabin pressure and the rate of change of the cabin pressure if it was determined that a problem exists with the cabin pressure. The processing device also issues a cabin depressurization alert over the alerting device based on at least one of the set alert volume or alert frequency, if there is a problem with the cabin pressure value.

11 Claims, 3 Drawing Sheets

CABIN ALTITUDE ALERTING SYSTEMS AND METHODS

BACKGROUND OF THE INVENTION

Currently, some aircraft use a single horn to alert the flight crew of any of a number of various problems. It can take a pilot some time to isolate what problem caused the horn to be activated. This can lead a pilot to misdiagnose the cause of the activated horn.

Therefore, there exists a need to intelligently alert the flight crew of certain types of problems that were previously associated with a single horn activation.

SUMMARY OF THE INVENTION

The present invention provides systems and methods for intelligently alerting the flight crew of a cabin depressurization.

An example system includes a cabin altimeter that generates a cabin pressure value, an alerting device, such as a speaker system and a processing device in data communication with the cabin altimeter and the alerting device. The processing device determines if there is a problem with the cabin pressure received from the cabin altimeter, determines rate of change of the cabin pressure, and sets at least one of an alert volume or an alert frequency based on the rate of change of the cabin pressure if it was determined that a problem exists with the cabin pressure. The processing device also issues a cabin depressurization alert over the alerting device based on at least one of the set alert volume or alert frequency, if there is a problem with the cabin pressure value. Operations repeat until the processing device determines that there is no longer a problem with the cabin pressure.

In one aspect of the invention, the processing device determines there is a problem with the cabin pressure value if the cabin pressure value is not greater than a predefined altitude, the aircraft's altitude above an intended runway is not greater than a first predefined value, and an aircraft's altitude above terrain is not greater than a second predefined value.

In another aspect of the invention, the system includes a data storage device that is in communication with the processing device for storing terrain data.

In still another aspect of the invention, the system selects an alert message from two or more previously stored alert messages if it was determined that a problem exists with the cabin pressure.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
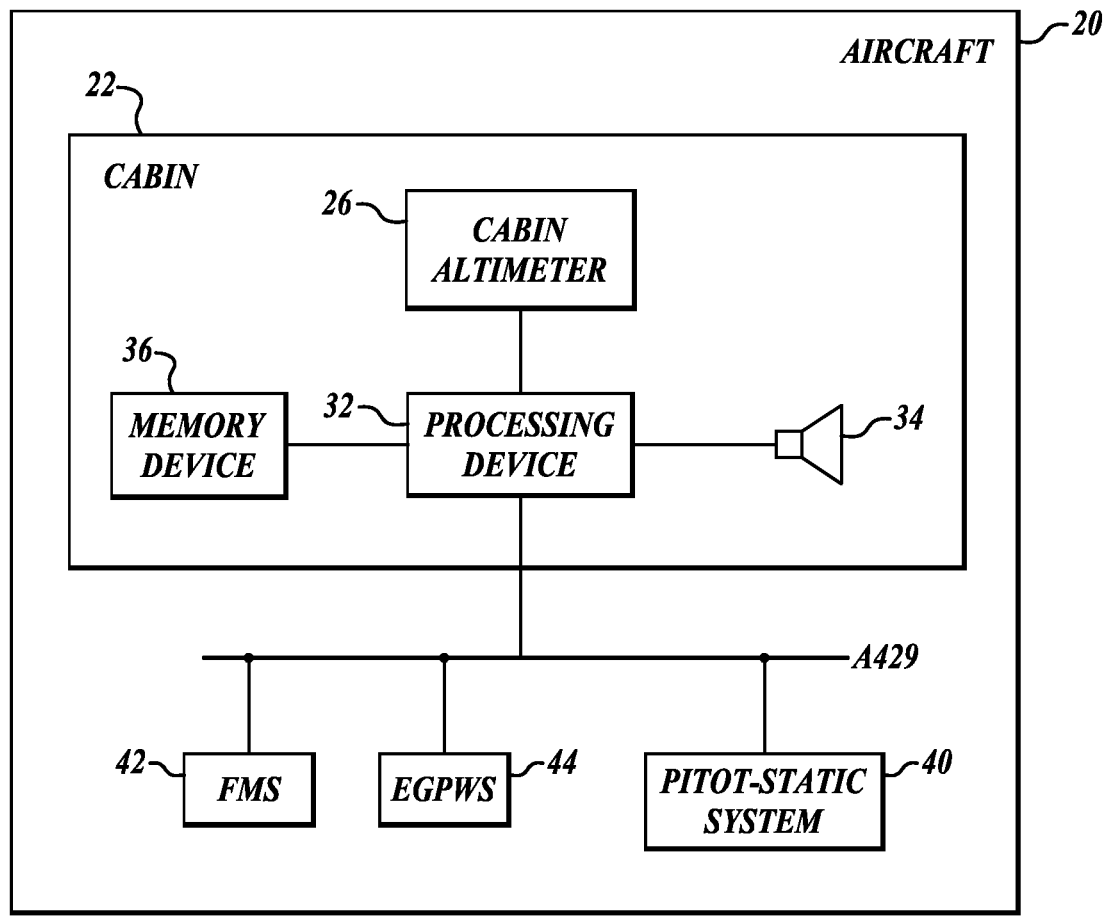
FIG. 1 illustrates a schematic diagram of a system formed in accordance with an embodiment of the present invention.

FIG. 1 illustrates a schematic block diagram of an example cabin pressure alerting system 22 located aboard an aircraft 20 or some other pressurized vehicle. The system 22 includes a cabin altimeter 26, a processing device 32, one or more speakers 34, and a memory device 36.

The processing device 32 is in signal communication with the cabin altimeter 26, the memory device 36, and the one or more speakers 34. The processing device 32 outputs an advisory message via the one or more speakers 34 based on certain predefined logic parameters after receiving a cabin altitude value from the altimeter 26. The logic parameters (see FIG. 3) use information retrieved from other sources such as a Flight Management System (FMS) 42, an Enhanced Ground Proximity Warning System (EGPWS) 44, and a Pitot-Static system 40. In one embodiment, an Air Data Computer (not shown) is part of the Pitot-Static system 40 for converting pressure data into electrical data (such as for use on an ARINC 429 (A429) databus). The A429 databus is connected to many pieces of avionics in the aircraft 20, such as the EGPWS 44 and FMS 42.

Figure 2:
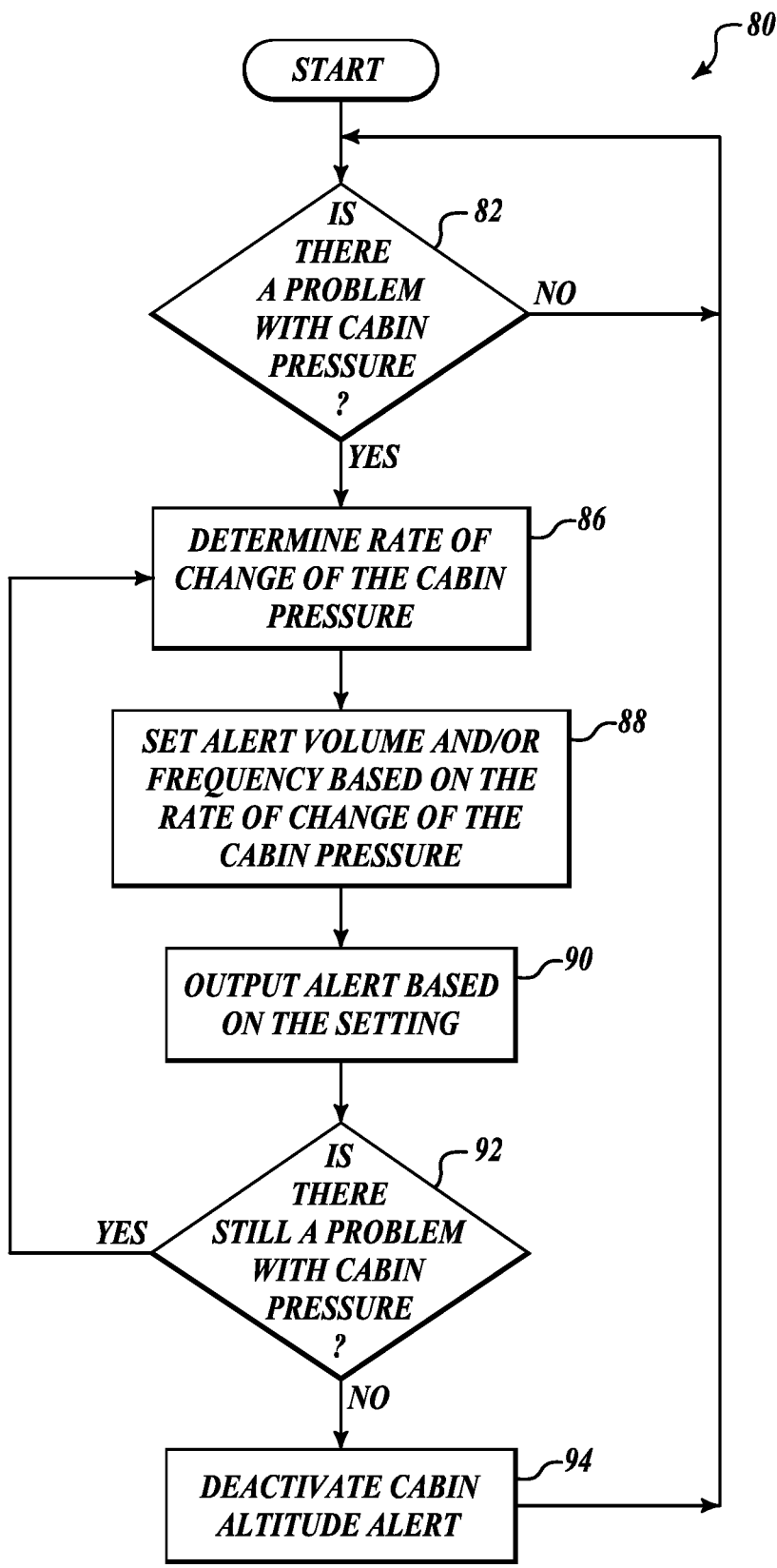
FIGS. 2 and 3 illustrate example processes performed by the system shown in FIG. 1 in accordance with embodiments of the present invention.

FIG. 2 illustrates an example process 80 performed by the system 22 shown in FIG. 1. First, at a decision block 82 the processing device 32 determines if there is a problem with the cabin pressure based on the cabin pressure value that is received from the cabin altimeter 26. If the processing device 32 determines that there is no problem with the cabin pressure, the process 80 repeats. If the processing device 32 does determine that there is a problem with the cabin pressure, then at a block 86, the processing device 32 determines a rate of change of the cabin pressure or retrieves the rate of change of cabin pressure that was previously determined. Next at a block 88, the processing device 32 sets an alert volume and/or alert frequency based on the rate of change of the cabin pressure. The alert volume and/or alert frequency may also be based on the cabin pressure. Other aspects of the alert may also be set at this step, for example, the type of alert message may be selected. At a block 90, an alert is output based on the set alert volume and/or alert frequency. Next at a decision block 92, the processing device 32 determines if there is still a problem with the cabin pressure. If the processing device 32 does determine that there still is a problem with the cabin pressure, the process returns to the block 86 to repeat and possibly alter the setting of the alert volume and/or alert frequency. If the processing device 32 determines that there is not a problem after the block 90, the cabin altitude alert is deactivated, see blocks 92 and 94. After the block 94, the process 80 returns to the decision block 92. The steps performed at the decision blocks 82 and 92 are described in more detail below with regard to FIG. 3.

Figure 3:
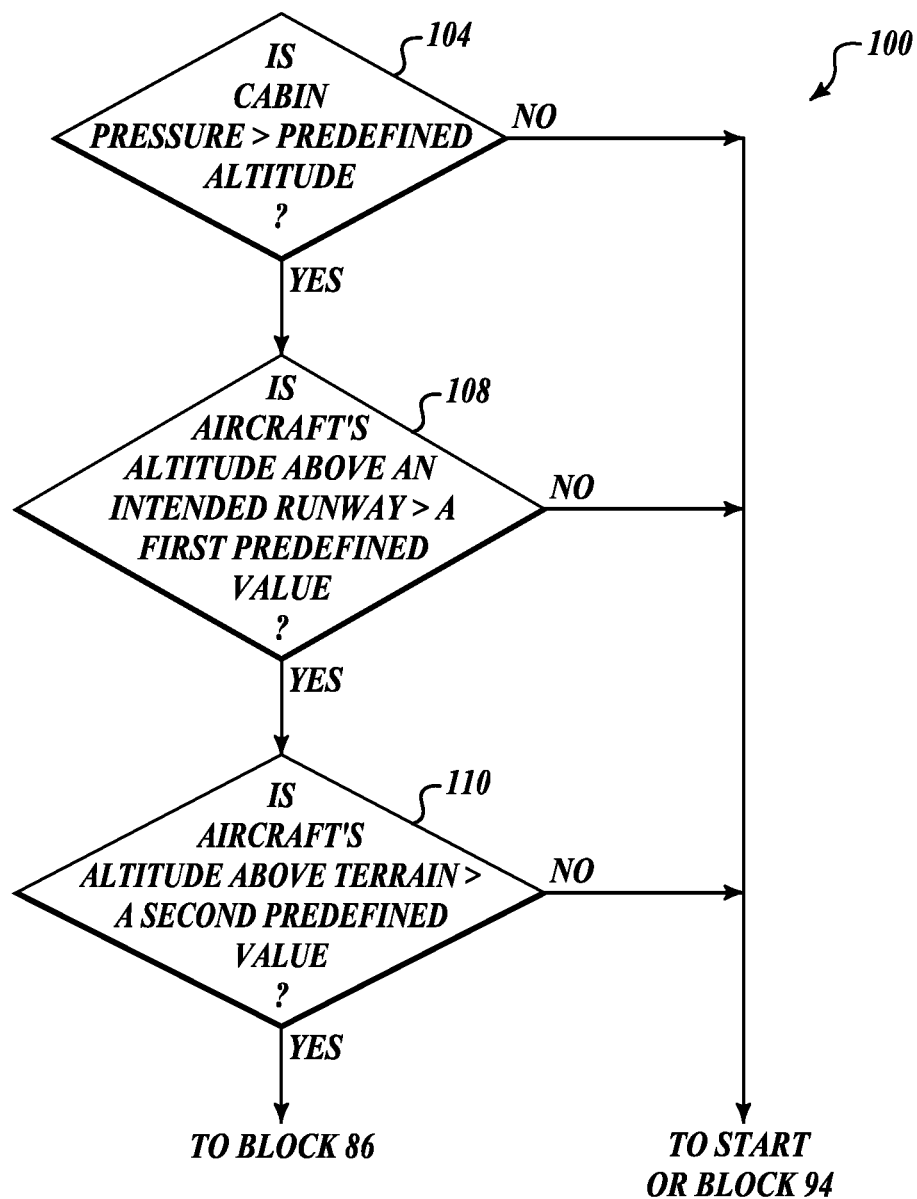

FIG. 3 illustrates an example process 100 performed by the processing device 32 for the determination of whether there is a problem with the cabin pressure (see blocks 82 and 92, FIG. 2). First, at a decision block 104, the processing device 32 determines if the cabin pressure (i.e., cabin altitude) received from the cabin altimeter 26 is greater than a predefined altitude. The predefined altitude is an altitude where the cabin depressurization discrete signal might normally be generated. In one embodiment, the pre-defined altitude is 10,000 feet. If the cabin pressure is not greater than the predefined altitude, then the decisions at blocks 82 and 92 are not satisfied. If the cabin pressure is greater than the predefined altitude, then the process 100 continues onto a decision block 108. At the decision block 108, the processing device 32 determines if the altitude of the aircraft above a closest or an intended runway or airport is greater than a first predefined altitude value. In one embodiment, this determination of closest or intended runway or airport is described in more detail in U.S. Pat. No. 6,983,206, which is hereby incorporated by reference, and might be incorporated in the EGPWS 44. If the aircraft's altitude above the intended runway/airport is not greater than the first predefined value, then there is not a problem with the cabin pressure. If the aircraft's altitude above the intended runway/airport is greater than the first predefined value, the process 100 continues onto a decision block 110.

At the decision block 110, the processing device 32 determines if the aircraft's altitude above terrain is greater than a second predefined altitude value. If the aircraft's altitude above the terrain is not greater than the second predefined value, there is not a problem with the cabin pressure. If, however, the aircraft's altitude above terrain is greater than a second predefined value, the process 100 continues to the block 86 (i.e., there is a problem with cabin pressure). Terrain information may be provided by a terrain database (the memory device 36) included with the EGPWS 44 and the aircraft altitude information may be provided by a number of sources, such as the EGPWS 44 (geometric altitude), the FMS 42, the Pitot-Static system 40, a radar altimeter or a combination of these sources.

While the preferred embodiment of the invention has been illustrated and described, as noted above, many changes can be made without departing from the spirit and scope of the invention. For example, the processing performed by the processing device 32 may be distributed across various processing platforms, such as the EGPWS 44. Also, the cabin altimeter 26 is located in the same pressure vessel (e.g., cockpit) as the EGPWS 44 and is connected to an unused input port on the EGPWS 44. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A cabin pressure alerting system comprising:
   a cabin altimeter configured to generate a cabin pressure value;
   an alerting device; and
   a processing device in data communication with the cabin altimeter and the alerting device, the processing device comprising:
      a first component configured to determine if there is a problem with the cabin pressure based on the generated cabin pressure value;
      a second component configured to determine rate of change of the cabin pressure;
      a third component configured to set at least one of an alert volume or an alert frequency based on the rate of change of the cabin pressure if it was determined by the first component that a problem exists with the cabin pressure,
      a fourth component configured to issue a cabin depressurization alert over the alerting device based on at least one of the set alert volume or alert frequency, if there is a problem with the cabin pressure value;
      wherein the second and third components repeat operations until the first component determines that there is no longer a problem with the cabin pressure.

2. The system of claim 1, wherein the first component further determines there is a problem with the cabin pressure value if the cabin pressure value is not greater than a predefined altitude.

3. The system of claim 1, wherein the second component further determines there is a problem with the cabin pressure value if the cabin pressure value is not greater than a predefined altitude; there is a problem with the cabin pressure value if the aircraft's altitude above an intended runway is not greater than a first predefined value; and there is a problem with the cabin pressure value if an aircraft's altitude above terrain is not greater than a second predefined value.

4. The system of claim 3, further comprising a data storage device (44) in communication with the processing device for storing terrain data, wherein the second component further determines there is a problem with the cabin pressure value based on the stored terrain data.

5. The system of claim 1, wherein the third component sets the alert volume and the alert frequency based on at least one of the cabin pressure value and the rate of change of the cabin pressure if it was determined by the first component that a problem exists with the cabin pressure.

6. The system of claim 1, wherein the third component selects an alert message if it was determined by the first component that a problem exists with the cabin pressure.

7. A method for providing a depressurization alert, the method comprising:
   a) receiving a cabin pressure value;
   b) determining rate of change of the cabin pressure value;
   c) determining if there is a problem with the cabin pressure value;
   d) setting at least one of alert volume or alert frequency based on the determined rate of change, if there is a problem with the cabin pressure value;
   e) issuing a cabin depressurization alert based on at least one of the set alert volume or alert frequency, if there is a problem with the cabin pressure value;
   f) determining if a problem with the cabin pressure still exists after issuance of the cabin depressurization alert; and
   g) altering at least one of the volume or frequency of the previously set alert volume or frequency, if a problem with the cabin pressure is determined to still exist after issuance of the cabin depressurization alert and the rate of change has changed from a previous value.

8. The method of claim 7, wherein c) comprises:
   determining there is a problem with the cabin pressure value if the cabin pressure value is not greater than a predefined altitude;
   determining there is a problem with the cabin pressure value if the aircraft's altitude above an intended runway is not greater than a first predefined value; and
   determining there is a problem with the cabin pressure value if an aircraft's altitude above terrain is not greater than a second predefined value.

9. The method of claim 8, wherein c) further comprises:
   accessing terrain data stored in a data storage device; and
   determining if there is a problem with the cabin pressure value based on the accessed terrain data.

10. The method of claim 7, wherein d) further comprises:
    setting the alert volume and the alert frequency based on at least one of the cabin pressure value and the rate of change of the cabin pressure if it was determined by the first component that a problem exists with the cabin pressure.

11. The method of claim 7, wherein d) further comprises:
    selects an alert message if it was determined by the first component that a problem exists with the cabin pressure.

* * * * *